FRANK C. SULZBACH
INVENTOR.

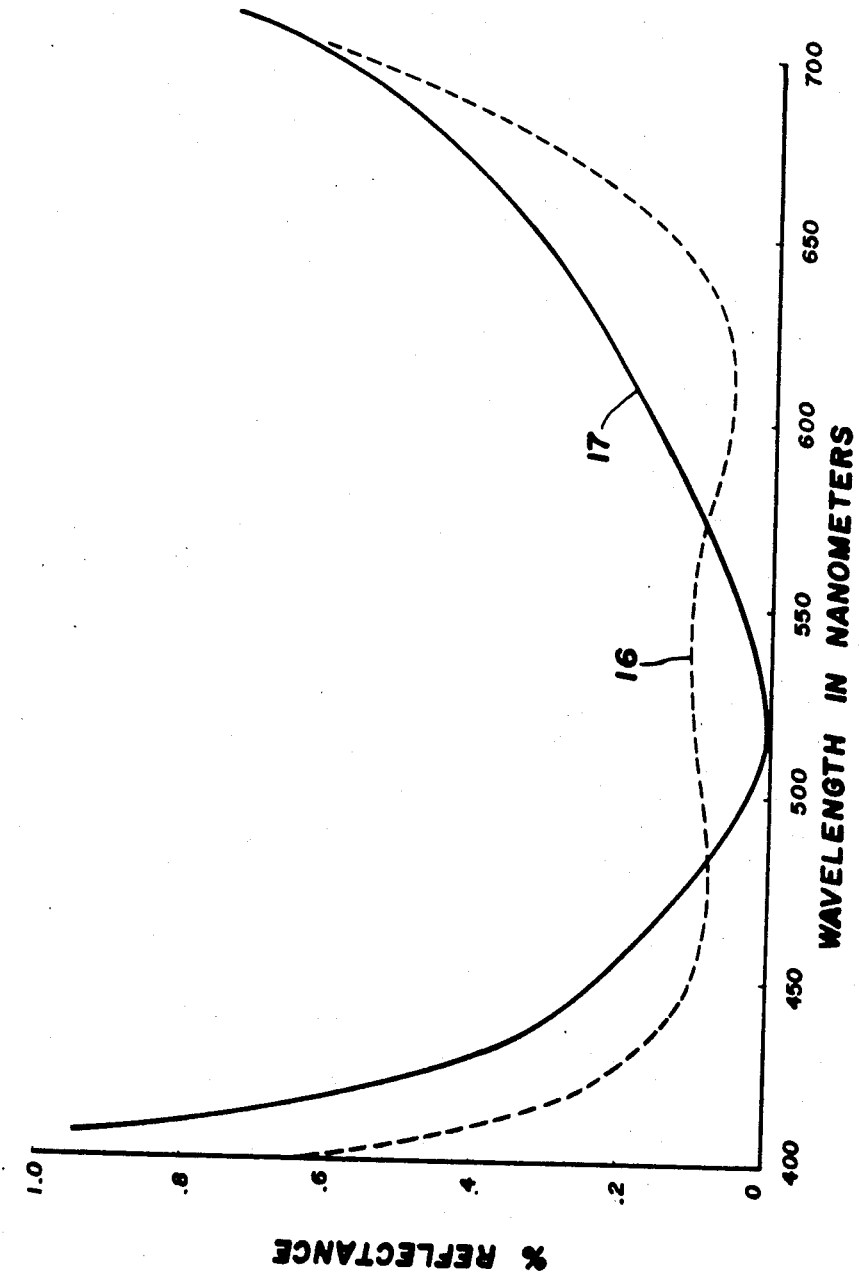

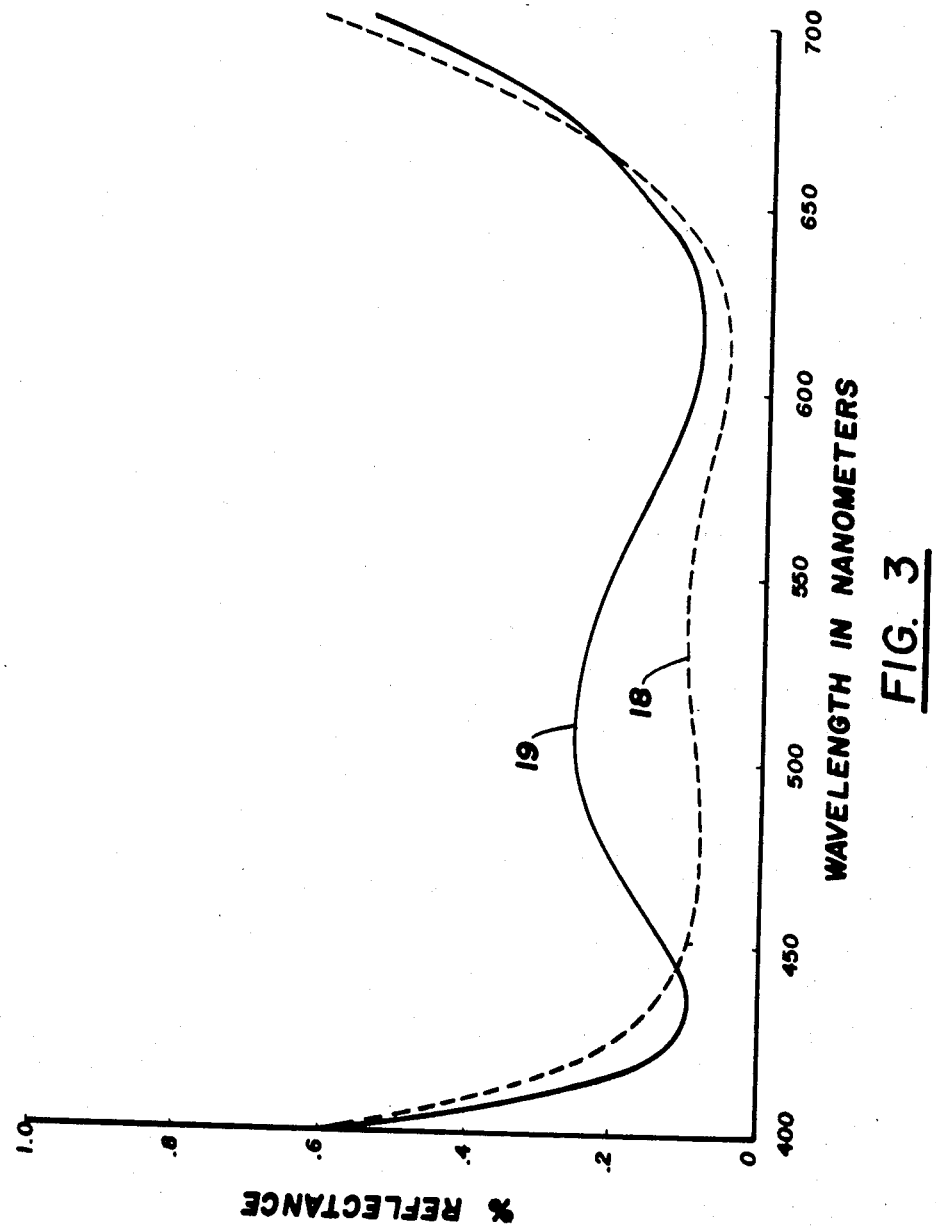

Feb. 23, 1971  F. C. SULZBACH  3,565,509
FOUR LAYERED ANTIREFLECTION COATINGS
Filed March 27, 1969  4 Sheets-Sheet 4
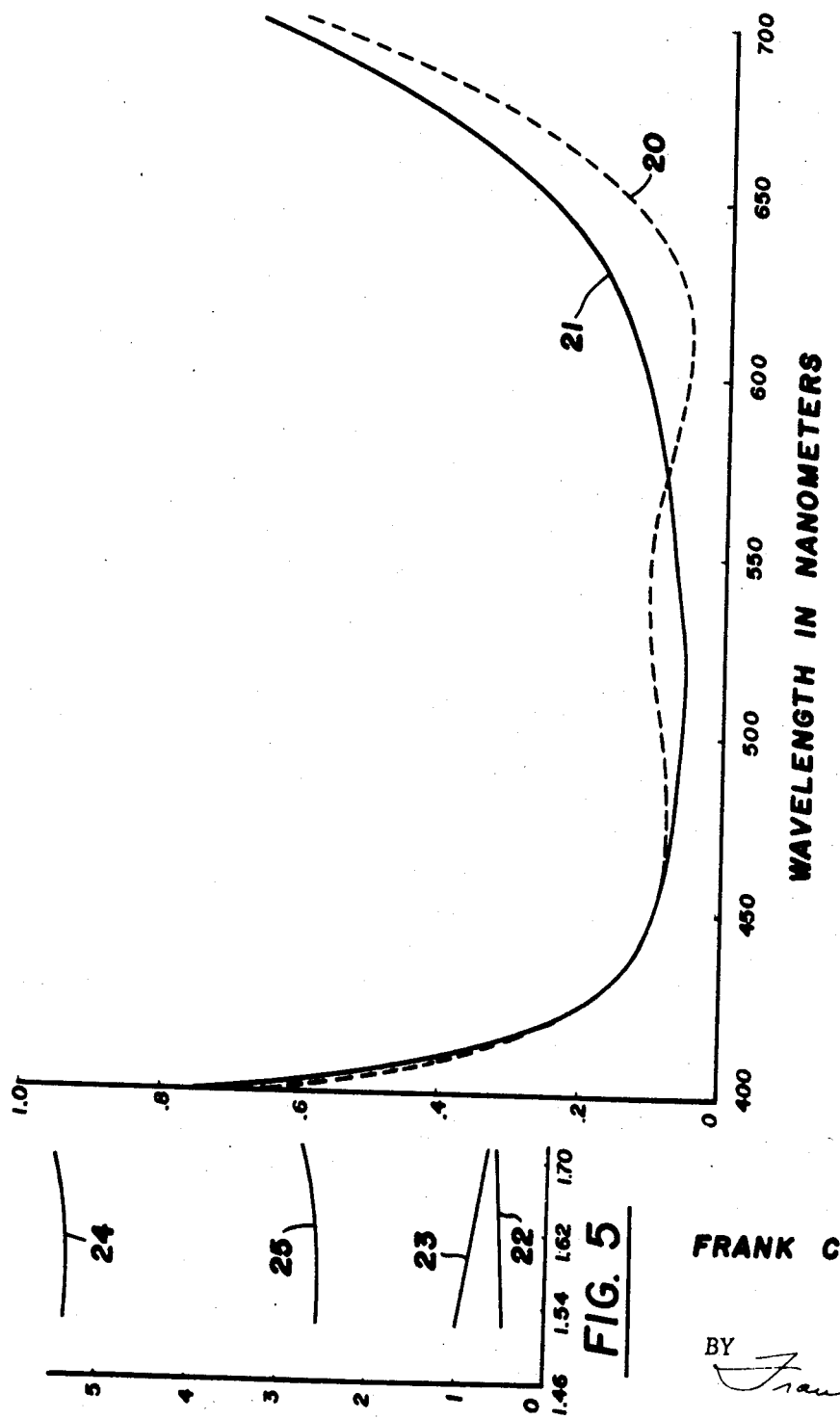
FRANK C. SULZBACH
INVENTOR.
BY *Frank O. Parker*
ATTORNEY

United States Patent Office 3,565,509
Patented Feb. 23, 1971

3,565,509
FOUR LAYERED ANTIREFLECTION COATINGS
Frank C. Sulzbach, Dallas, Tex., assignor to Bausch & Lomb Incorporated, Rochester, N.Y., a corporation of New York
Filed Mar. 27, 1969, Ser. No. 811,131
Int. Cl. G02b 1/10
U.S. Cl. 350—164                 6 Claims

ABSTRACT OF THE DISCLOSURE

A multilayer antireflection coating using a combination of only two filming materials is an improvement over known coatings that require at least three filming materials. The filming materials of the coatings deposited using conventional techniques eliminating the need of an electron beam evaporation device. The λ/4 layer next to the substrate of the conventional 3-layer coating is improved upon by a one period equivalent layer.

BACKGROUND OF THE INVENTION

(1) Field of the invention

Multilayer antireflection coatings are applied to optical systems to substantially eliminate reflections over a relatively wide portion of the visible spectrum. Transmission of light is thereby increased and contrast is improved by reducing ghost images.

(2) Brief description of the prior art

One type of particularly effective multilayer anti-reflection coating is disclosed by Thelen in U.S. Pat. 3,185,020 granted May 25, 1965. The Thelen patent discloses a three layer coating consisting of a first layer deposited on a substrate one-quarter wavelength in optical thickness of a first filming material, a second layer one-half wavelength in optical thickness of a second filming material, and a third layer one-quarter wavelength in optical thickness of a third filming material. The coating can be applied to a suitable substrate by use of a vacuum coating technique.

The use of three or more filming materials is less than desirable because of problems that may be encountered in the vacuum system such as contamination. In addition, the more filming materials used, the greater the number of evaporation parameters which must be controlled.

Finally, a large number of commonly used filming materials must be applied by a controlled electron beam evaporation source commonly called an electron gun.

SUMMARY OF THE INVENTION

I have discovered that by carefully controlling the thickness of at least four alternate layers of two filming materials I can produce antireflection coatings equal to or better than those known to the art using three or more different filming materials. By carefully selecting the filming materials the need for an electron gun evaporation source is removed.

Therefore, it is the primary object of this invention to provide improved antireflection coatings.

It is another object of this invention to provide antireflection coatings composed of alternate layers of two filming materials.

It is still another object of this invention to provide broad band antireflection coatings constructed using conventional vacuum coating techniques.

BRIEF DESCRIPTION OF THE DRAWINGS

FIG. 2 is a comparison plot of percent reflectance versus wavelength for a coating according to one embodiment of the invention and for a prior art three layer coating.

FIG. 3 is a comparison plot of the embodiment of the invention and for a prior art three layer coating.

FIG. 4 is a comparison plot of the embodiment of FIG. 2 with a third three layer prior art coating.

FIG. 5 is a plot of component layer thickness versus substrate index of refraction. In FIG. 5 the ordinate (y axis) represents optical thickness in terms of $\lambda_o$ that is, $.1\lambda_o$, $.2\lambda_o$, $3\lambda_o$, $4\lambda_o$, $5\lambda_o$. The abscissa (x axis) is the index of refraction of the substrate.

DESCRIPTION OF THE PREFERRED EMBODIMENTS

Figure 1:
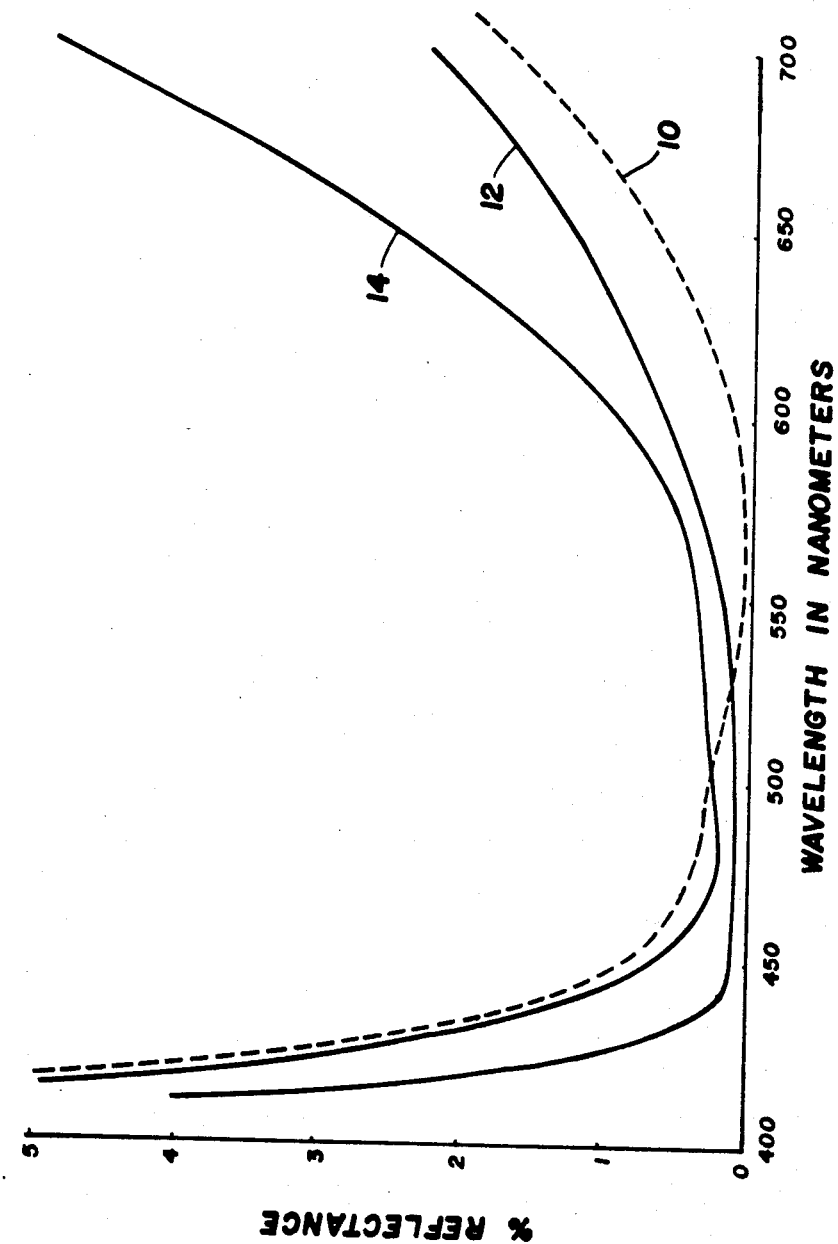
FIG. 1 is a plot of percent reflectance versus wavelength for measured and calculated coatings according to the principles of the present invention.

Three layer antireflection coatings, as described by Thelen, have few suitable materials for the layers next to the substrate and the high index layer in the middle. There is a way to use more tractable filming materials to obtain the required index of refraction. The basic idea was set forth by L. I. Epstein in his article "The Design of Optical Filters," JOSA, vol. 42, p. 806 and further delineated by P. H. Berning in his article "Use of Equivalent Films in the Design of Infrared Multilayer Antireflection Coatings," JOSA, vol. 52, p. 431. Basically a symmetrical array of layers is used to obtain an equivalent layer having an equivalent index of refraction and an equivalent thickness. By varying the relative thickness of the layers the value of the equivalent index can be varied. Nearly any equivalent thickness can be obtained by merely repeating the fundamental period as many times as necessary. The simplest case of such an equivalent layer uses two indices and three layers. The fundamental period must be symmetrical about the center of the period.

Referring to the drawings and in particular to FIG. 1, curve 10 shows a calculated curve for an antireflection coating wherein the layer next to the substrate is a one period equivalent layer. This equivalent layer is composed of three thin layers. Next to the substrate is a layer of the higher index material of optical thickness $n_h t_h$. Next is a layer of the lower index material of optical thickness $n_l t_l = 2(n_h t_h)$. Next is a layer of higher index material of the higher index material of optical thickness $n_h t_h$. The total optical thickness of the components of the equivalent layer is less than $\lambda_o/4$, where $\lambda_o = 510$ nm. The second layer is one-half wavelength in optical thickness of the higher index material and the third layer is one-quarter wavelength thick of the lower index material. Since the third component layer of the equivalent layer has the same index as the $\lambda_o/2$ layer which is deposited next, the two are coalesced into a single layer as below.

Also shown in FIG. 1 are measured curves 12 and 14 for an antireflection coating constructed according to the following configuration:

$$\text{Glass}/.241\frac{\lambda}{4}/.486\frac{\lambda}{4}/2.241\frac{\lambda}{4}/1.0\frac{\lambda}{4}/\text{Air}$$

wherein the substrate was glass having an index of refraction of 1.52. The first layer (next to the substrate) is ZnS, the second layer MgF$_2$, the third layer ZnS and the fourth layer MgF$_2$. These coatings are constructed in accordance with the principles of my invention wherein an equivalent structure is achieved.

Shown in FIGS. 2, 3 and 4 are curves 16, 18 and 20, respectively, for a coating constructed according to the principles of my invention in the following configuration;

$$\text{Glass}/.232\frac{\lambda}{4}/.316\frac{\lambda}{4}/2.11\frac{\lambda}{4}/1.00\frac{\lambda}{4}/\text{Air}$$

wherein the substrate was glass having an index of refraction of 1.52 and $\lambda$ is 510 nanometers. In each case, the first layer (next to the substrate) is $ZrO_2$ and the second layer $MgF_2$, the third layer $ZrO_2$ and the fourth layer $MgF_2$. The properties of the one period equivalent layer are such that in order to attain the optimum antireflection band width the thickness of the third layer from the substrate should be less than the sum of the thickness of the thin layer next to the substrate plus a half-wave. This is a refinement of the first aproximation coating shown in FIG. 1.

In FIG. 2, the curve designated 17 is for a coating on a 1.52 index glass of a first layer one-quarter wavelength thick of a first material having an index of refraction 1.70, the second layer one-half wavelength thick of a material having an index of refraction of 2.10 and the third layer one-quarter wavelength thick of a material having an index of 1.38. This coating is generally referred to as a quarter-half-quarter wave coating.

Curve 19 of FIG. 3 is the calculated reflectance of a quarter-half-quarter wave coating, wherein the first layer is of an index of refraction of 1.62, the second layer is of an index of refraction of 1.96 and the third layer is of an index of refraction of 1.38. This coating could be made using $Al_2O_3$, $ZrO_2$ and $MgF_2$, respectively.

Curve 21 of FIG. 4 is a quarter-half-quarter wave coating, wherein the first layer is of an index of refraction of 1.66, the second layer is of index of refraction of 2.04 and the third layer is of index of refraction of 1.38. This coating could be made using $CeF_3$, $Nd_2O_3$ and $MgF_2$, respectively.

Comparing curves 16–17, 18–19 and 20–21 it is obvious that my coating using two materials synthesized to form an equivalent coating provides broader anti-reflecting properties in the visible spectrum.

In addition, for the prior art coatings, $Al_2O_3$ has to be deposited with an electron gun whereas my filming materials are easy to deposit using conventional techniques.

In FIG. 5, there are shown curves 22, 23, 24 and 25 of layer thickness plotted against change in substrate index. Curve 22 is for layer 1 (next to substrate), curve 23 for layer 2, curve 24 for layer 3 and curve 25 for layer 4. Using these curves it is possible to select the proper layer thickness for the entire usable range of optical substrate indices.

I have also found that $CeO_2$ and $MgF_2$ may be used as a pair of filming materials in place of ZnS and $MgF_2$, shown in curves 12 and 14.

It is also possible to substitute $SiO_2$ for $MgF_2$ for use with $CeO_2$. Coatings of $CeO_2/SiO_2$ have nearly the same performance as $ZrO_2/MgF_2$ coatings. An example of an antireflection coating constructed of $CeO_2$ and $SiO_2$ is as follows:

$$\text{Glass}/.232\frac{\lambda}{4}/.329\frac{\lambda}{4}/2.1\frac{\lambda}{4}/.99\frac{\lambda}{4}/\text{Air}$$

Having thus described my invention by reference to several preferred embodiments I wish it understood that changes and modifications can be made without departing from the scope of the appended claims.

I claim:

1. A non-absorbing substantially colorless multi-layer anti-reflecting coating for use on a body having light reflecting surfaces and an index of refraction of between 1.42 and 1.72 comprising:
a first layer deposited on the substrate of a first dielectric filming material and having an optical thickness of about $$.232\frac{\lambda}{4}$$

a second layer deposited on the first layer of a second dielectric filming material and having an optical thickness of about $$.316\frac{\lambda}{4}$$

a third layer of the first filming material deposited on the second layer and having an optical thickness of about $$2.11\frac{\lambda}{4}$$

a fourth layer of the second filming material deposited on the third layer and having an optical thickness of about $$1.00\frac{\lambda}{4}$$

wherein $\lambda$ is a selected wavelength of the visible spectrum between 500 and 550 nanometers.

2. A coating according to claim 1 wherein the first filming material is zirconium oxide and the second filming material is magnesium fluoride.

3. A coating according to claim 1 wherein the component layer thicknesses are adjusted according to the index of refraction of the substrate.

4. A non-absorbing substantially colorless multi-layer anti-reflecting coating for use on a body having light reflecting surfaces and an index of refraction of between 1.42 and 1.72 comprising:
a first layer of cerium oxide deposited on the substrate and having an optical thickness of about $$.232\frac{\lambda}{4}$$

a second layer of silicon dioxide deposited on the first layer of cerium oxide and having an optical thickness of about $$.329\frac{\lambda}{4}$$

a third layer of cerium oxide deposited on the second layer of silicon dioxide and having an optical thickness of about $$2.1\frac{\lambda}{4}$$

and
a fourth layer of silicon dioxide deposited on the third layer of cerium oxide and having an optical thickness of about $$.99\frac{\lambda}{4}$$

wherein $\lambda$ is a selected wavelength of the visible spectrum of 500 to 550 nanometers.

5. A non-absorbing substantially colorless multilayer anti-reflecting coating for use on a body having light reflecting surfaces and an index of refraction of between 1.42 and 1.72 comprising:
a first layer of cerium oxide deposited on the substrate and having an optical thickness of about $$.241\frac{\lambda}{4}$$

a second layer of magnesium fluoride deposited on the first layer of cerium oxide and having an optical thickness of about $$.486\frac{\lambda}{4}$$

a third layer of cerium oxide deposited on the second layer of magnesium fluoride and having an optical thickness of about $$2.241 \frac{\lambda}{4}$$

and
a fourth layer of magnesium fluoride deposited on the third layer of cerium oxide and having an optical thickness of about $$1.0 \frac{\lambda}{4}$$

wherein $\lambda$ is a selected wavelength of the visible spectrum of 500 to 550 nanometers.

6. A non-absorbing substantially colorless multilayer anti-reflecting coating for use on a body having light reflecting surfaces and an index of refraction of between 1.42 and 1.72 comprising:
a first layer of zinc sulfide deposited on the substrate and having an optical thickness of about $$.241 \frac{\lambda}{4}$$

a second layer of magnesium fluoride deposited on the first layer of zinc sulfide and having an optical thickness of about $$.486 \frac{\lambda}{4}$$

a third layer of zinc sulfide deposited on the second layer of magnesium fluoride and having an optical thickness of about $$2.241 \frac{\lambda}{4}$$

and
a fourth layer of magnesium fluoride deposited on the third layer of zinc sulfide and having an optical thickness of about $$1.0 \frac{\lambda}{4}$$

wherein $\lambda$ is a selected wavelength of the visible spectrum of 500 to 550 nanometers.

References Cited

UNITED STATES PATENTS

| | | | |
|---|---|---|---|
| 3,235,397 | 2/1966 | Millendorfer | 350—164 |
| 3,432,225 | 3/1969 | Rock | 350—164 |
| 3,463,574 | 8/1969 | Basteen et al. | 350—164 |

OTHER REFERENCES

Baumeister, D. W.: "Multilayer Filters," U.S. Defense Supply Agency: Military Handbook 141, Optical Design, Oct. 5, 1962, pp. 20–16.

DAVID SCHONBERG, Primary Examiner

T. H. KUSMER, Assistant Examiner

U.S. Cl. X.R.

117—33.3